X 12500

X 12500

United States Patent Office 3,431,073
Patented Mar. 4, 1969

3,431,073
METHOD OF PRODUCTION OF ACTIVE
BERYLLIUM OXIDE POWDERS
Kazuo Kobayashi and Michiaki Yamauchi, Nagoya,
Japan, assignors to NGK Insulators, Ltd., Nagoya,
Japan, a corporation of Japan
Filed Dec. 21, 1964, Ser. No. 420,041
Claims priority, application Japan, Dec. 26, 1963,
38/70,013
U.S. Cl. 23—183                    7 Claims
Int. Cl. C01f 3/00

ABSTRACT OF THE DISCLOSURE

Active beryllium oxide powders having a large surface area are prepared by dissolving a beryllium compound such as the sulfate, carbonate, acetate, nitrate, chloride, oxalate, or hydroxide in an aqueous solution of sulfuric acid, nitric acid, hydrochloric acid or ammonium hydroxide to give a beryllium salt solution, adjusting the pH of the solution between 1.5 and 5.0, evaporating said aqueous solution so as to produce a viscous of flossy residue of beryllium compound and thermally decomposing the beryllium compound at a temperature of from 300 to 1,200° C.

---

This invention relates to a method of production of active beryllium oxide powders adapted for use as a raw material for refractories, absorbents and catalysts.

Beryllium oxide powders are at present used for crucibles for melting metals, protective tubes for thermocouples and wafers for electronic parts by utilizing its high refractory nature, chemical stability and high thermal conductivity, whilst the most important use of beryllium oxide powders is for the refractory material of reactors by utilizing the property of small capture cross section for thermal neutrons.

In all of the above purposes the major objection to the broader use for beryllium oxide is that the manufacturing cost for forming and sintering of beryllium oxide ceramics is very high and accordingly, the product is very expensive as compared with other ceramics. This is due to the fact that the melting point of beryllium oxide powder is very high, namely 2,650° C., and also it is very stable chemically so that it requires extremely high temperature for sintering molded powders. Acordingly, at present the sintering is effected at a high temperature of 1,800 to 2,000° C. or by hot pressing method or by inclusion of additives such as magnesia (MgO), alumina ($Al_2O_3$) and calcia (CaO) and the like to make the sintering easier. Since the manufacturing cost is thus increased for beryllium oxide ceramics of high purity, there is a demand for beryllium oxide which can be sintered at a lower temperature.

The object of the invention is to provide a method of industrially manufacturing active beryllium oxide powder which can be sintered at a comparatively low temperature and adapted for use as adsorbents and catalysts.

The activity of beryllium oxide is affected by several factors. The one of major importance is the surface area of the particles, the greater the surface area the more readily is the sintering effected. The powder produced according to applicants' invention has a particle diameter less than one-tenth that of the conventional powdered beryllium oxide with a large surface area and better sintering properties. In other words, the invention was attained as the result of investigation for the purpose of obtaining fine powders of beryllium oxide having large surface area. The invention consists in a method of preparing beryllium oxide powder comprising the steps of dissolving beryllium sulfate, carbonate, acetate, nitrate, chloride, oxalate or hydroxide in an aqueous solution containing sulfuric acid, nitric acid, hydrochloric acid or ammonium hydroxide to give a beryllium salt solution, adjusting the pH of the solution to between 1.5 and 5.0, evaporating said aqueous solution so as to produce a viscous of flossy resdue of beryllium compound and thermally decomposing the compound at a temperature of from 300 to 1,200° C. The method of the invention will be explained by means of the examples in the following:

Beryllium hydroxide $Be(OH)_2$ was dissolved in dilute sulfuric acid $H_2SO_4$ by slowly adding the latter until the pH of the solution becomes about 3.0 by adjusting the amount of dilute sulfuric acid. Beryllium hydroxide remaining in the beryllium salt solution thus obtained is removed by filtering, then the solution is put in a container such as an evaporating pan and heated and concentrated to a viscous state having high viscosity and then to a flossy state. It is then treated with oxalic acid or sulfuric acid as hereinafter described and heated to high temperatures in an electric furnace to thermally decompose the beryllium compound, to obtain the fine powders of beryllium oxide. The terms "viscous state" and "flossy state" refer to the physical conditions of the concentrated beryllium compound solution at particular stages of the process.

The beryllium salt solution in the above example may be assumed to have a composition similar to beryllium sulfate-beryllium hydroxide from the addition quantity of sulfuric acid and it may be considered that the flossy product as above mentioned may be obtained by the reason that when it is evaporated to the solid state beryllium complexes are formed and $SO_2$ gas is produced by the thermal decomposition of a part of the beryllium sulfate causing a bubbling action.

The conditions carrying out the method of the invention are as follows:

(1) The limitation of pH of the beryllium salt solution which is a starting material to 1.5 to 5 is due to the reason that where the pH is less than 1.5 beryllium salt precipitates as a crystal, i.e., beryllium sulfate, during the evaporation and the flossy state, as described above, does not occur, and at a pH above 5 the precipitate is beryllium hydroxide and it is difficult to obtain a solution containing beryllium at a high concentration.

(2) When the beryllium salt solution being concentrated contains $NO_3^-$, $Cl^-$, $CH_3COO^-$, $C_2O_4^{--}$ or $CO_3^{--}$ ions instead of $SO_4^{--}$ or $OH^-$, ions, the operation and results are the same. For instance, starting with a beryllium salt solution containing $Be^{++}$, $NO_3^-$, $OH^-$ ions, the same active beryllium powder is obtained by this process.

(3) In the above example though beryllium hydroxide has been dissolved in sulfuric acid, yet even when other beryllium compounds such as beryllium chloride $BeCl_2$, beryllium nitrate $Be(NO_3)_2$ are dissolved in sulfuric acid or when crystalline beryllium sulfate is dissolved in ammonia water the active beryllium oxide powder as desired may be obtained if the pH of the solution is maintained at 1.5 to 5.

(4) It is requisite that the addition agents should decompose entirely as gases or vapors in the thermal decomposition of the beryllium compound so that no residue therefrom remains in the product beryllium oxide powder. Suitable addition agents are oxalic acid, sulfuric acid, urea, ammonium salts such as ammonium carbonate, ammonium nitrate, ammonium sulfate, ammonium acetate, ammonium oxalate, ammonium chloride. From the standpoint of economy and efficiency, the amount of the additive should be less than 30% by weight based on the beryllium compound.

(5) Another suitable addition agent is crystalline BeSO$_4$·4H$_2$O, which is added in quantities less than 95% of the total weight of the resulting mixture.

The characteristic feature of the method of the invention is that the active beryllium oxide powder is obtained by the thermal decomposition of a beryllium compound solution evaporated to a flossy state. While the exact composition of this flossy state beryllium compound is not clear, it is considered to be an aggregate of extremely fine particles as compared with the crystals ordinarily obtainable from beryllium sulfate or beryllium nitrate.

Although the effect of the addition agent, such as oxalic acid or sulfuric acid is apparent, the reasons therefor are not clear. However, it is believed that, taking oxalic acid as representative, various gases are produced therefrom during the thermal decomposition of the beryllium salt compound, according to the reaction $$H_2C_2O_4 \rightarrow CO_2 + CO + H_2O$$

which modify the thermal decomposition conditions for the beryllium salt and affect the physical properties of the resulting beryllium oxide particles.

According to the invention the effect of addition agents added to fine crystal particles of the beryllium compound is greater as a matter of course than the effect of the addition agents added to crystals of an ordinary size. This fact is shown in Example 6. The condition of thermal decomposition of the beryllium compound needs to be determined by the kinds of such compound and in any event a temperature slightly above the decomposition temperature should be used. The temperature at which thermal decomposition takes place depends on the composition of the beryllium compound. In practice, it has been found that temperatures of between 300° and 1,200° C. are needed. In case of beryllium sulfate as the main constituent, the grain size of beryllium oxide powder becomes larger as the increase of temperature as shown in FIG. 4 and on the contrary, the specific surface area lowers as the temperature increases.

While in the foregoing, the agent is added at the flossy stage, this may be also done while the beryllium compound is in the viscous state provided that due care is taken to avoid decomposition of the addition agent during the subsequent concentration evaporating and drying operations.

For a better understanding of the invention, reference is made to the accompanying drawings, in which.

The invention has the following advantages:

(1) The principal operation is concentration of a solution which is readily adapted to a continuous procedure which is especially desirable for an industrial operation.

(2) Conventionally produced beryllium oxide powder has a surface area of 10 to 20 m.$^2$/g. while the fine powder obtained by the invention has a surface area more than 20 m.$^2$/g. so that it has higher activity and is adapted for use as refractory material, catalysts etc.

(3) Raw materials of commonly used catalysts are mostly of the hydrides and can not be used at high temperatures (below several hundred degrees), whilst the product obtained by the method of the invention is apparently in the form of oxides so that it may be used at high temperatures.

(4) By essentially concentrating a solution having pH adjusted a high purity product is obtained without contamination or introducing impurities.

(5) The raw material to be used may be cheap compounds such as sulfuric acid H$_2$SO$_4$, ammonium hydroxide NH$_4$OH, oxalic acid H$_2$C$_2$O$_4$ so that cost is very low.

(6) The operation is simple since the only condition is pH regulation of the solution.

EXAMPLE 1

Figure 1:
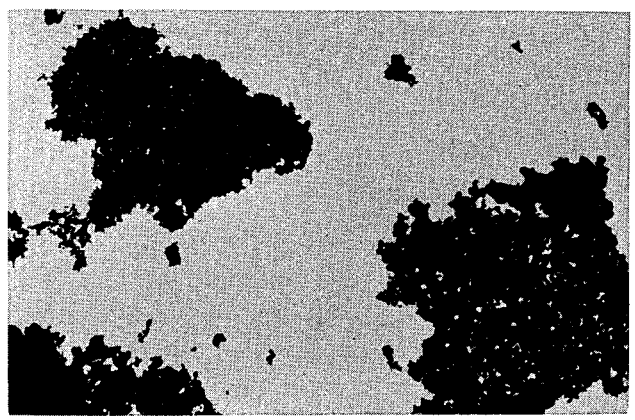
FIG. 1 is a photopicture taken by electron microscope of beryllium oxide powders obtained by the method of the invention.

To 200 g. of beryllium hydroxide paste (containing about 90% water) conc. sulfuric acid was added gradually to dissolve beryllium hydroxide and to form a beryllium salt solution, the addition of sulfuric acid being stopped when the pH of the solution became 3.5. The beryllium salts solution thus obtained was placed in a platinum evaporating pan of about 4 liter capacity and heated by a gas burner to concentrate and evaporate the solution to a flossy state. To this product 20 g. of oxalic acid were added and subjected to thermal decomposition at 1,000° C. for 3 hours and yielded fine powder of beryllium oxide of about 10 g. (FIG. 1) and this powder was press formed to a pellet of 15 mm. in dia. by applying a pressure of 1.5 ton/cm.$^2$. It was placed in a N$_2$ atmosphere together with a pellet of ordinary beryllium oxide powder available on the market molded under the same condition and heated at 1,600° C. for 2 hours. The densities of the pellets thus obtained are shown in the following table (three samples each).

| Sample powder | Condition of manufacture | Heated in N$_2$ furnace at 1,600° C. for 2 hrs. |
|---|---|---|
| Example of the invention. | Example | Density (g./cc.) 2.98, 2.97, 2.98. |
| Ordinary product (A) | Product obtained by thermal decomposition of BeSO$_4$ crystal at 1,000° C. for 3 hrs. | Density (g./cc.) 2.45, 2.31, 2.43. |
| Ordinary product (B) | Product obtained by thermal decomposition of Be(OH)$_2$ at 800° C. for 3 hrs. | Density (g./cc.) 2.20, 2.23, 2.24. |

Figure 2:
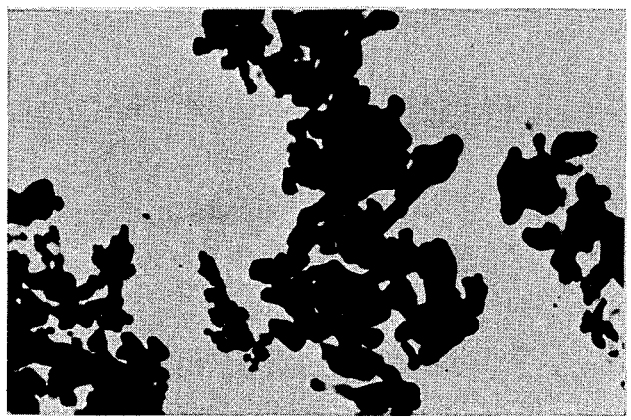
FIG. 2 is a similar photopicture of beryllium oxide powder available on the market taken by electron microscope.
Figure 3:
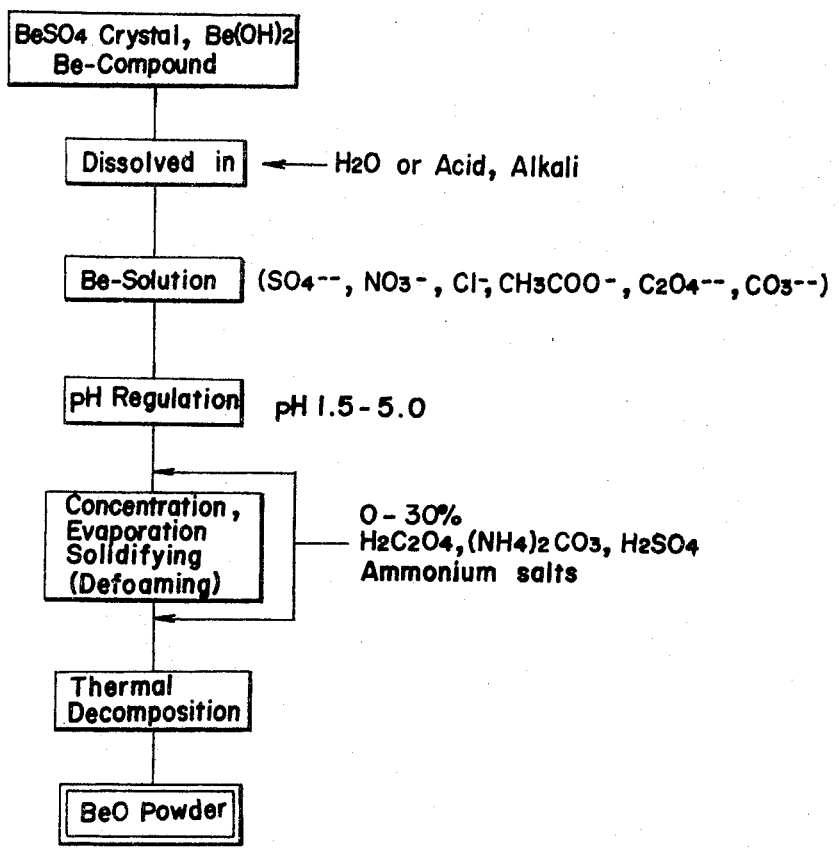
FIG. 3 is a flow sheet diagram illustrating the method of manufacturing beryllium oxide powders by the invention.
Figure 4:
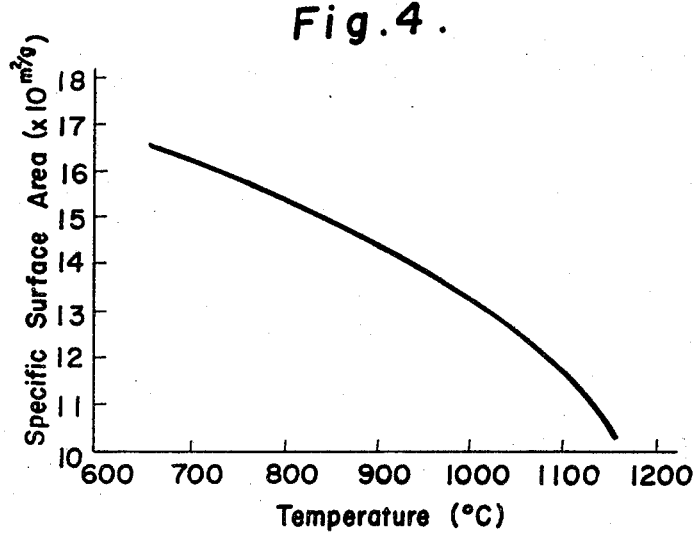
FIG. 4 is a curve illustrating the relation between the temperature of thermal decomposition and the specific surface area of the beryllium oxide powder.

The beryllium oxide product available on the market (A) has a large particle size as shown in FIG. 2 and low sinterability. Product (B) is approximately the same.

EXAMPLE 2

| Starting material | | pH | Sintering property (g./cc.) of the powder in N$_2$ furnace at 1,600° C. for 2 hours | | |
|---|---|---|---|---|---|
| Salts | Kinds of solution | | | | |
| BeSO$_4$·4H$_2$O | In dilute ammonia water | 4.5 | 2.95 | 2.95 | 2.96 |
| Be(OH)$_2$ | In dilute hydrochloric acid | 4.0 | 2.89 | 2.90 | 2.93 |
| Be(OH)$_2$ | In dilute nitric acid | 4.0 | 2.92 | 2.92 | 2.92 |
| Be(OH)$_2$ | In dilute sulfuric acid | 3.5 | 2.97 | 2.98 | 2.98 |
| BeCO$_3$ | do | 2.5 | 2.95 | 2.93 | 2.91 |
| BeC$_2$O$_4$ | do | 3.5 | 2.91 | 2.96 | 2.92 |
| Be(CH$_3$COO)$_2$ | do | 3.0 | 2.98 | 2.99 | 2.96 |
| BeCl$_2$·4H$_2$O | In dilute ammonia water | 3.0 | 2.83 | 2.87 | 2.88 |

As to the composition of solution when the beryllium salts solution was concentrated, the salt as shown in the table was dissolved in water, acid or alkali and adjusted to the pH as shown in the table, then operated similarly to that as described in Example 1 and to the flossy beryllium compound thus obtained was added oxalic acid each 20 g., then subjected to thermal decomposition in an electric furnace at 1,000° C. for 3 hours and the sintering property was tested as in Example 1.

EXAMPLE 3

By the same procedure as in Example 1 about 5 kg. of flossy beryllium compound were produced, and to 100 g. samples of the beryllium compound were added 10 g. of various addition agents as shown in the following table, then thermally decomposed at 1,000° C. for 3 hours. Each sample yielded about 15 g. of active beryllium oxide powder. The properties were as shown in the following table. The product prepared without an addition agent showed a somewhat lower sintering property though the specific surface area was large.

| Sample No. | Addition agent (commercial products) | Sintering property in $N_2$ atmosphere at 1,600° C. for 2 hrs. | | | Specific surface area |
|---|---|---|---|---|---|
| 1 | $H_2C_2O_4 \cdot 2H_2O$ | 2.97 | 2.95 | 2.95 | $7.5 \times 10$ m.2/g. |
| 2 | $(NH_2)_2CO$ | 2.86 | 2.85 | 2.86 | $6.3 \times 10$ m.2/g. |
| 3 | $(NH_4)_2CO_3$ | 2.89 | 2.91 | 2.91 | $7.2 \times 10$ m.2/g. |
| 4 | $NH_4NO_3$ | 2.87 | 2.87 | 2.86 | $7.2 \times 10$ m.2/g. |
| 5 | $NH_4CH_3CO_2$ | 2.86 | 2.87 | 2.86 | $7.2 \times 10$ m.2/g. |
| 6 | $(NH_4)_2C_2O_4 \cdot H_2O$ | 2.92 | 2.93 | 2.92 | $7.5 \times 10$ m.2/g. |
| 7 | $NH_4Cl$ | 2.89 | 2.89 | 2.88 | $7.2 \times 10$ m.2/g. |
| 8 | $H_2C_2O_4 + (NH_2)_2CO$ | 2.99 | 2.98 | 2.98 | $7.5 \times 10$ m.2/g. |
| 9 | $(NH_4)_2CO_3 + NH_4NO_3$ | 2.90 | 2.91 | 2.88 | $6.9 \times 10$ m.2/g. |
| 10 | | 2.83 | 2.81 | 2.83 | $13.0 \times 10$ m.2/g. |
| Ordinary product (A) | | 2.45 | 2.31 | 2.43 | $1.5 \times 10$ m.2/g. |
| Ordinary product (B) | | 2.20 | 2.23 | 2.24 | $1.7 \times 10$ m.2/g. |

EXAMPLE 4

Figure 5:
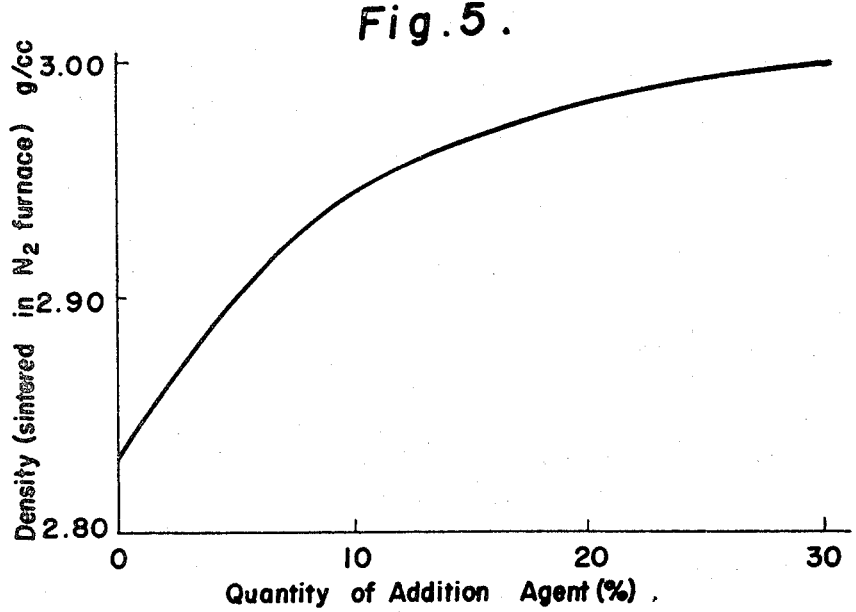
FIG. 5 is a curve illustrating the relation between the quantity of addition agent and sintering density.

To each 100 g. sample of flossy beryllium compounds obtained by Example 3 oxalic acid was added in the range 0 to 50% and its effect was observed. As the result, it has been found that even when oxalic acid was not added, the beryllium oxide powder manufactured by the method of the invention had better activity compared with beryllium oxide powder obtained on the market. The sintering properties of the powder increased gradually with the increase in the quantity of oxalic acid added, attaining a peak at about 30%, making the range 0–30% preferable for industrial purpose. The results are shown in FIG. 5.

EXAMPLE 5

In order to compare the suitability as a catalyst of the beryllium oxide powder obtained by Example 1 and that available on the market the following test was effected.

Five g. samples of beryllium oxide powders were kept in desiccators containing some water for 24 hours, weighed and then dried at 120° C. for 24 hours. From the difference in weight after drying, the moisture absorbed in the beryllium oxide powders was calculated.

Samples: Absorbed quantity of moisture, g.
  Powder obtained by Example 1 _____ 0.95
  Ordinary product (A) _____ 0.15
  Ordinary product (B) _____ 0.20

It has been found from the results shown in the table that the beryllium oxide powder obtained by the method of the invention has very large absorption capacity and is adapted for use as catalysts and adsorbent etc.

EXAMPLE 6

The following tests were conducted for ascertaining the effect of adding the addition agent to the flossy beryllium compound which is the characteristic of the invention.

A comparison was made between the effect of adding 10 g. of ammonium nitrate to beryllium sulfate having larger crystal grain and that of the present invention. The results are shown in the following table.

As apparent from the above table, the beryllium oxide powder obtained by the method of the invention had high sintering degree (density).

EXAMPLE 7

One liter of beryllium salts solution of pH 3.5 was prepared in the same manner as Example 1 and the solution was concentrated by heating in a quartz evaporating pan to a volume of 500 ml. This concentrated beryllium salts solution was introduced into a vacuum concentrating device lined with rubber and 100 g. of oxalic acid were added. This concentrated beryllium salts-oxalic acid mixture was heated and concentrated under vacuum (10 mm. Hg) to dryness and a flossy beryllium compound was obtained. This compound was thermally decomposed in an electric furnace at 1,000° C. for 3 hours and about 50 g. of beryllium oxide powder was obtained. This powder was sintered in $N_2$ atmosphere as described in Example 1 and the beryllium oxide pellet thus obtained by sintering had a density of 2.99 and 2.98 g./cc. and had activity.

EXAMPLE 8

Concentrated beryllium sulfate solution was prepared by the method of the invention to which crystalline $BeSO_4 \cdot 4H_2O$ was added as shown in the following table and the mixture was thermally decomposed in an electric furnace at 1,000° C. for 3 hours and prepared 50 g. each of beryllium oxide powders. These powders were sintered in $N_2$ atmosphere as described in the preceding examples: the density of the beryllium oxide products thus obtained were as shown in the following table.

MIXTURE (PARTS BY WEIGHT)

|  | Addition agent |
|---|---|
| Concentrated beryllium sulfate: | $BeSO_4 \cdot 4H_2O$ |
| 0 | 100 |
| 5 | 95 |
| 25 | 75 |
| 50 | 50 |
| 75 | 25 |
| 100 | 0 |

What we claim is:

1. A method of preparing beryllium oxide powders comprising the steps of dissolving a beryllium compound selected from the group consisting of the sulfate, carbonate, acetate, nitrate, chloride, oxalate and hydroxide in an aqueous solution containing a compound selected from the group consisting of sulfuric acid, nitric acid, hydrochloric acid and ammonium hydroxide to produce an aqueous beryllium salt solution, adjusting the pH of the resulting beryllium salt solution to between 1.5 and 5.0, evaporating said aqueous solution so as to produce a flossy residue of beryllium compound, thermally decomposing the said beryllium compound at a temperature of from 300 to 1,200° C. and recovering the resultant beryllium oxide powder.

| Sample | Addition agent, g. | Thermal decomposition temperature | Sintering property at 1,600° C. for 2 hrs. in $N_2$ atmosphere (g./cc.) | |
|---|---|---|---|---|
| $BeSO_4$ crystal (1 mm. dia.) 100 g | 10 | 1,000° C. 3 hrs | 2.75 | 2.77 |
| Beryllium compound obtained by Example 3 100 g | 10 | ____do____ | 2.87 | 2.88 |

2. A method according to claim 1, wherein the aqueous solution contains ammonium hydroxide.

3. A method according to claim 1, wherein beryllium hydroxide is dissolved in dilute sulfuric acid.

4. A method of preparing beryllium oxide powders comprising the steps of dissolving a beryllium salt selected from the group consisting of the sulfate, carbonate, acetate, nitrate, chloride, oxalate and hydroxide in an aqueous solution containing a compound selected from the group consisting of sulfuric acid, nitric acid, hydrochloric acid and ammonium hydroxide to give a beryllium salt solution, adjusting the pH of the solution to between 1.5 and 5.0, evaporating said aqueous solution so as to produce a flossy residue of beryllium compound, adding to the beryllium compound at least one addition agent selected from the group consisting of oxalic acid, urea, ammonium chloride, ammonium sulfate, ammonium carbonate, ammonium nitrate, ammonium acetate and ammonium oxalate in an amount of less than 30% by weight of the beryllium compound, decomposing the resulting mixture at a temeprature of from 300 to 1,200° C., and recovering beryllium oxide as a powder.

5. A method according to claim 4, wherein the addition agent is oxalic acid.

6. A method of preparing beryllium oxide powders comprising the steps of dissolving a beryllium salt selected from the group consisting of the sulfate, carbonate, acetate, nitrate, chloride, oxalate and hydroxide in an aqueous solution containing a compound selected from the group consisting of sulfuric acid, nitric acid, hydrochloric acid and ammonium hydroxide to give a beryllium salt solution, adjusting the pH of the solution to between 1.5 and 5.0, evaporating said aqueous solution so as to produce a flossy residue of beryllium compound, adding to the beryllium compound as an addition agent crystalline $BeSO_4 \cdot 4H_2O$ in the amount of less than 95% of the total weight of the resulting mixture, decomposing the mixture at a temperature of from 300 to 1,200° C., and recovering the thereby-produced beryllium oxide powder.

7. A method according to claim 6, wherein the starting beryllium salt is beryllium sulfate.

References Cited

UNITED STATES PATENTS

| | | | |
|---|---|---|---|
| 3,099,532 | 7/1963 | Kirkpatrick et al. | 23—183 |
| 3,100,686 | 8/1963 | Sturm | 23—183 |
| 3,172,728 | 3/1965 | Schwenzfeier | 23—183 |

EDWARD J. MEROS, *Primary Examiner.*